(12) United States Patent
Shridevi et al.

(10) Patent No.: US 10,057,281 B2
(45) Date of Patent: Aug. 21, 2018

(54) RUNTIME DETECTION OF A BANDWIDTH DENIAL ATTACK FROM A ROGUE INTERCONNECT

(71) Applicants: Rajesh Jayashankara Shridevi, Bengaluru (IN); Dean Michael Ancajas, Austin, TX (US); Koushik Chakraborty, Logan, UT (US); Sanghamitra Roy, Logan, UT (US)

(72) Inventors: Rajesh Jayashankara Shridevi, Bengaluru (IN); Dean Michael Ancajas, Austin, TX (US); Koushik Chakraborty, Logan, UT (US); Sanghamitra Roy, Logan, UT (US)

(73) Assignee: Utah State University, Logan, UT (US)

( * ) Notice: Subject to any disclaimer, the term of this patent is extended or adjusted under 35 U.S.C. 154(b) by 106 days.

(21) Appl. No.: 15/079,486

(22) Filed: Mar. 24, 2016

(65) Prior Publication Data

US 2016/0285899 A1    Sep. 29, 2016

Related U.S. Application Data

(60) Provisional application No. 62/137,636, filed on Mar. 24, 2015.

(51) Int. Cl.
*G06F 11/00* (2006.01)
*H04L 29/06* (2006.01)
*H04L 12/933* (2013.01)

(52) U.S. Cl.
CPC ...... *H04L 63/1416* (2013.01); *H04L 63/1458* (2013.01); *H04L 49/109* (2013.01)

(58) Field of Classification Search
CPC ............ H04L 63/1416; H04L 63/1458; H04L 49/109
USPC .......................................................... 726/23
See application file for complete search history.

(56) References Cited

U.S. PATENT DOCUMENTS

| | | | | |
|---|---|---|---|---|
| 2004/0170123 | A1* | 9/2004 | Carpenter | H04L 63/1458 370/229 |
| 2004/0205374 | A1* | 10/2004 | Poletto | H04L 41/064 714/4.2 |
| 2012/0185633 | A1* | 7/2012 | Sano | G06F 15/17381 710/316 |

(Continued)

OTHER PUBLICATIONS

Shridevi et al., Runtime Detection of a Bandwidth Denial Attack from a Rogue Network-on-Chip, All Graduate Theses and Dissertations 1-56 (2015).

*Primary Examiner* — Mohammad W Reza

(57) ABSTRACT

For runtime detection of a bandwidth denial attack from a rogue NoC. The apparatus includes a processor and a memory storing code executable by the processor. The processor generates a plurality of proximal analogous packets each corresponding to a given packet traversing a multiprocessor system-on-chips (MPSoC). Each proximal analogous packet includes one or more of a proximal source modified from a given packet source and a proximal destination modified from a given packet destination. The processor further compares traversal latencies between each proximal analogous packet/given packet pair. In addition, the processor detects a rogue interconnect in response to aggregate variations in the traversal latencies.

17 Claims, 11 Drawing Sheets

(56) References Cited

U.S. PATENT DOCUMENTS

2016/0094467 A1* 3/2016 Hong ................. H04L 45/24
370/235

* cited by examiner

RUNTIME DETECTION OF A BANDWIDTH DENIAL ATTACK FROM A ROGUE INTERCONNECT

CROSS-REFERENCE TO RELATED APPLICATIONS

This application claims priority to U.S. Provisional Patent Application 62/137,636 entitled "RUNTIME DETECTION OF A BANDWIDTH DENIAL ATTACK FROM A ROGUE NETWORK-ON-CHIP" and filed on Mar. 24, 2015 for Rajesh Jayashankar Sridevi, which is incorporated here by reference.

GOVERNMENT RIGHTS

This work was supported in part by National Science Foundation grants (CNS-1117425, CAREER-1253024, CCF-1318826, CNS-1421022, CNS-1421068) and donation from the Micron Foundation.

FIELD

The subject matter disclosed herein relates to a rogue interconnect on a network-on-chip (NoC) and more particularly relates to runtime detection of a bandwidth denial attach from the rogue interconnect.

BACKGROUND

Description of the Related Art

Multiprocessor System-on-Chips (MPSoC) include NoCs from different sources including third party sources.

BRIEF SUMMARY

An apparatus is disclosed for runtime detection of a bandwidth denial attack from a rogue interconnect. The apparatus includes a processor and a memory storing code executable by the processor. The processor generates a plurality of proximal analogous packets each corresponding to a given packet traversing a MPSoC. Each proximal analogous packet includes one or more of a proximal source modified from a given packet source and a proximal destination modified from a given packet destination. The processor further compares traversal latencies between each proximal analogous packet/given packet pair. In addition, the processor detects the rogue interconnect in response to aggregate variations in the traversal latencies. A method and program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1A:
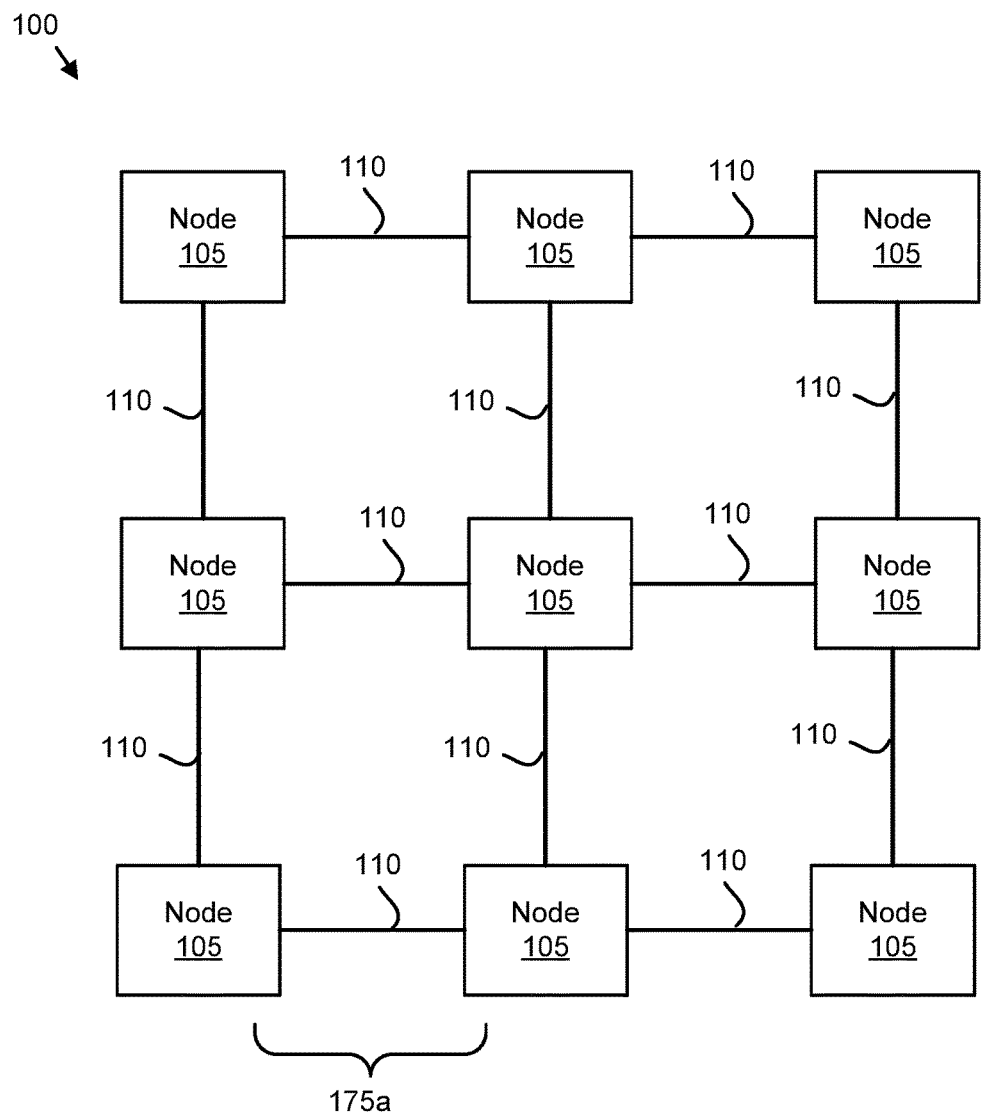
FIG. 1A is a schematic block diagram illustrating one embodiment of a MPSoC.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Python, Ruby, Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

Sridevi, Rajesh Jayashankar; Ancajas, Dean Michael; Chakraborty, Koushik; and Roy, Sanghamitra; "Runtime Detection of a Bandwidth Denial Attack from a Rogue Network-on-Chip" is incorporated herein by reference.

The description of elements in each figure may refer to elements of proceeding figures. Like numbers refer to like elements in all figures, including alternate embodiments of like elements.

FIG. 1A is a schematic block diagram illustrating one embodiment of an MPSoC 100. The MPSoC 100 may be implemented in a semiconductor device. In the depicted embodiment, the MPSoC 100 includes a plurality of nodes 105. Each node 105 may be connected to other nodes 105 by one or more links 110. Nodes 105 may communicate by transmitting packets over the one or more links 110. In one embodiment, the transmission of a packet over one link 110 is referred to as a hop 175a.

Each node 105 may include one or more NoC. The NoC may be a custom design. However, the NoC may also be licensed from a third party. In addition, the NoC may include one or more functional units that are licensed from a third party.

Unfortunately, a NoC may include a functional unit that is a rogue interconnect. The rogue interconnect may be designed to perform a malicious function. The malicious function may not be detectable during simulation of the MPSoC 100. In addition, the malicious function may not be detectable during a test of the MPSoC 100. In one embodiment, the malicious function is activated in response to an external communication to the rogue interconnect. Alternatively, the malicious function may be activated when a specified condition is satisfied for the MPSoC 100.

The malicious function may include a bandwidth denial attack directed at a node 105, NoC, or functional unit. Alternatively, the malicious function may include monitoring communications between processes on the MPSoC 100, collecting and transmitting secure information such as encryption keys to a designated address, corrupting information, and the like.

For example, during a bandwidth denial attack, the rogue interconnect may send a victim node 105 multiple packets to degrade the performance of the victim node 105. As a result, the performance of the victim node 105 and the MPSoC 100 is compromised. However, the rogue interconnect is difficult to detect, particularly if the rogue interconnect only occasionally performs a malicious function.

The embodiments described herein detect the rogue interconnect by generating one or more proximal analogous packets that each correspond to a given packet traversing the MPSoC 100. The embodiments further compare traversal latencies between each pair of a proximal analogous packet and the corresponding given packet. The embodiments detect the rogue interconnect in response to aggregate variations in traversal latencies as will be described hereafter.

Figure 1B:
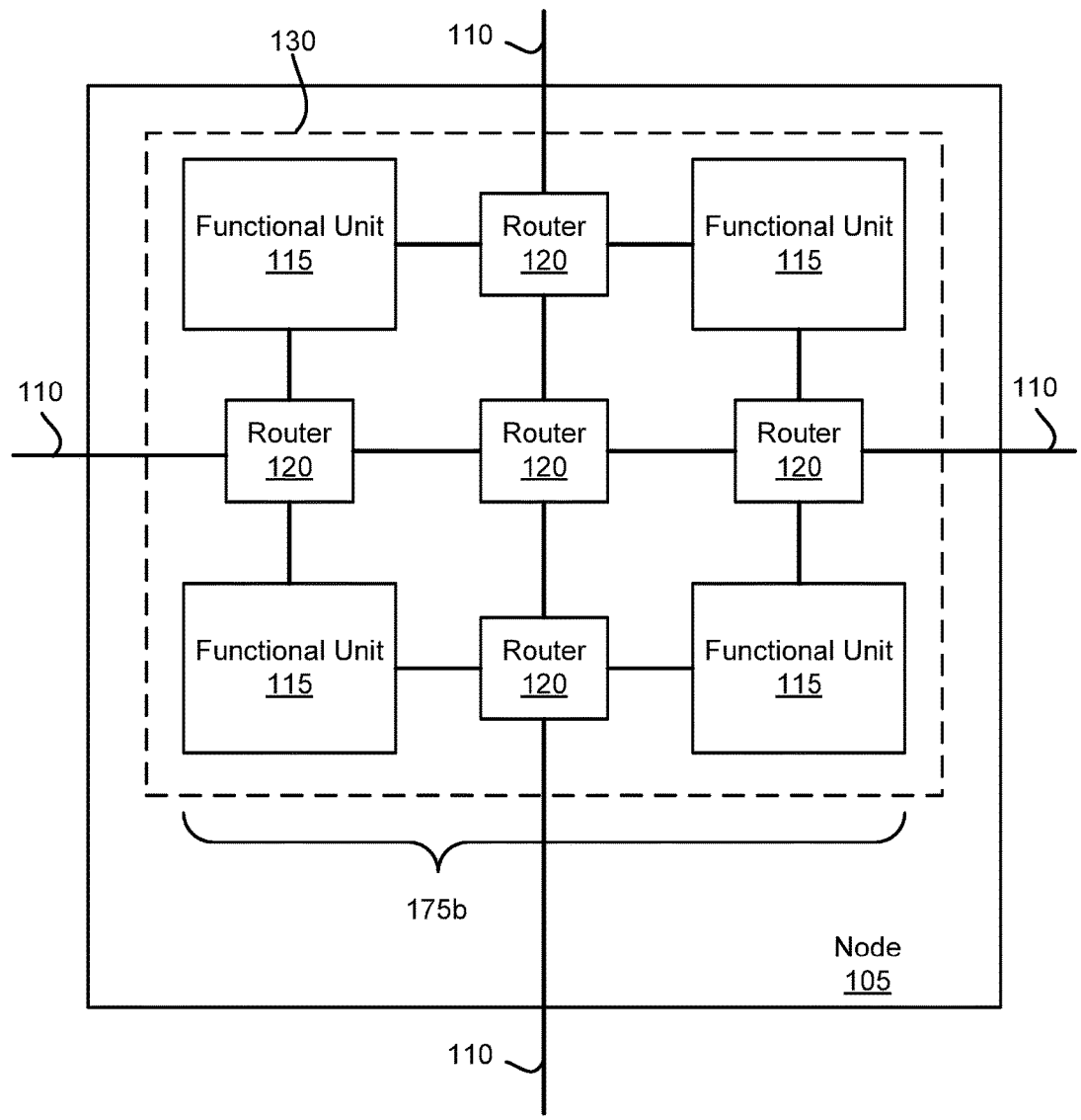
FIG. 1B is a schematic block diagram illustrating one embodiment of a node.

FIG. 1B is a schematic block diagram illustrating one embodiment of a node 105. A node 105 may include one or more NoC 130. Each NoC 130 may include one or more routers 120 in communication with one or more links 110. In addition, routers 120 may communicate with other routers 120 and with one or more functional units 115. Although for simplicity, the node 105 is shown with one NoC 130, a node 105 may include any number of NoC 130. In addition, each NoC 130 may include any number of functional units 115, routers 120, and other complements organized in a variety of topologies. In one embodiment, the transmission of a packet between two functional units 115 is referred to as a hop 175b.

Figure 1C:
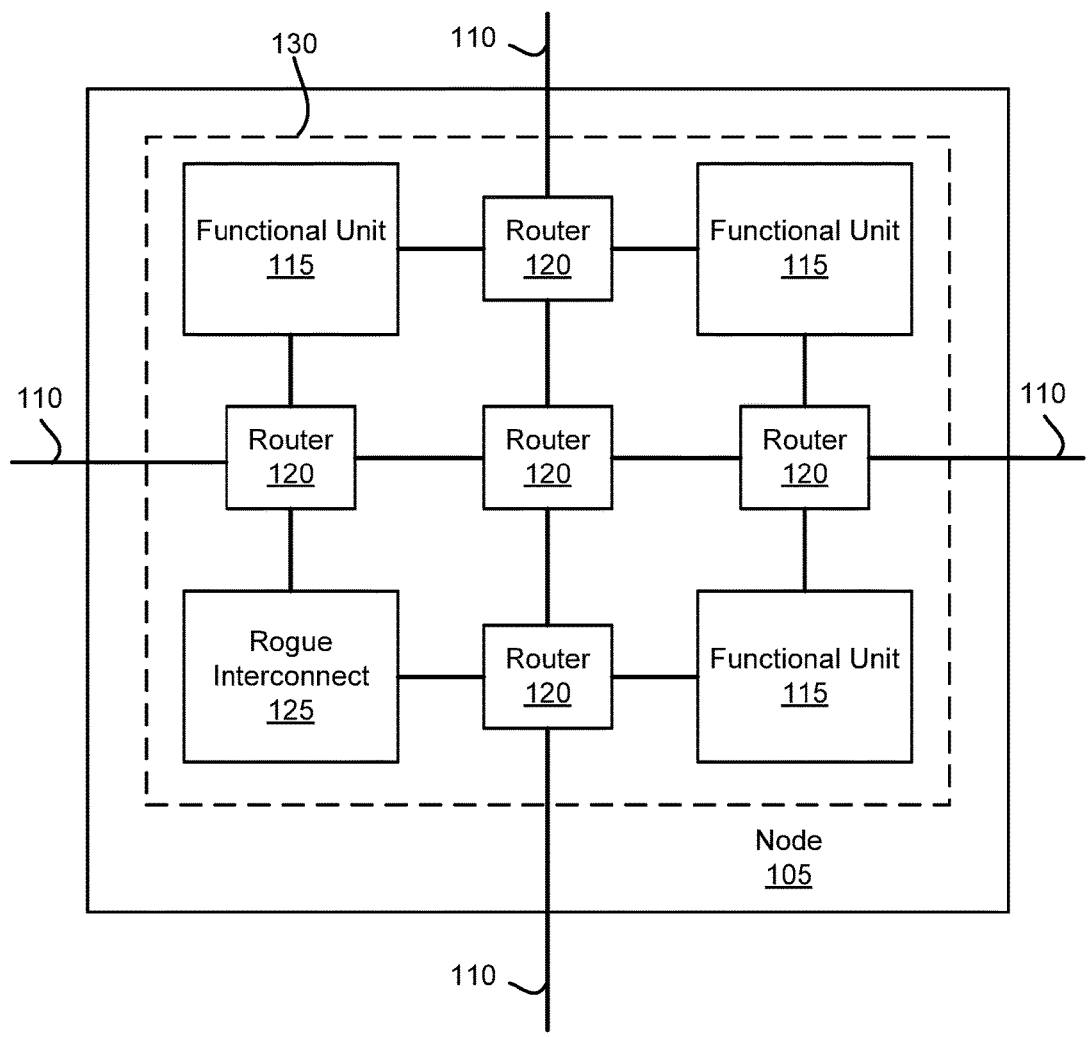
FIG. 1C is a schematic block diagram illustrating one embodiment of a node with a rogue interconnect.

FIG. 1C is a schematic block diagram illustrating one embodiment of a node 105 with a rogue interconnect 125. The node 105 of FIG. 1B is shown with a rogue interconnect 125 in place of a functional unit 115. The rogue interconnect 125 may be introduced into the NoC 130 by a third-party designer or from a third-party library. In addition, the rogue interconnect 125 may be added with malicious intent.

In one embodiment, the rogue interconnect 125 may initiate a denial of service attack against another functional unit 115 and/or another NoC 130 within the MPSoC 100. The rogue interconnect 125 may initiate the denial of service attack in response to a message from outside the MPSoC 100 to the rogue interconnect 125. Alternatively, the rogue interconnect 125 may monitor a status of the MPSoC 100 and initiate the denial of service attack in response to a predetermined status. For example, the rogue interconnect 125 may initiate the denial of service attack when the MPSoC 100 is within a specified geographic area, after a specified number of hours of operation, in response to communications with a specified Internet Protocol address, or the like.

Alternatively, the rogue interconnect 125 may monitor packets that are transmitted over the links 110 and/or between routers 120. The rogue interconnect 125 may further detect specified information such as account numbers, passwords, encryption keys, and the like. In addition, the rogue interconnect 125 may transmit the specified information to an address outside of the MPSoC 100.

Figure 2A:
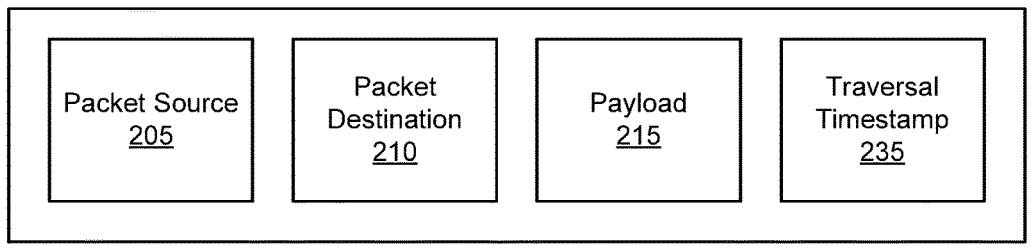
FIG. 2A is a schematic block diagram illustrating one embodiment of a packet.

FIG. 2A is a schematic block diagram illustrating one embodiment of a packet 200. The packet 200 may comprise digital data that is communicated between the nodes 105 over the links 110 and/or between functional units 115 through the routers 120. In the depicted embodiment, the packet 200 includes a packet source 205, a packet destination 210, a payload 215, and a traversal timestamp 235. The packet source 205 may specify the node 105 and/or functional unit 115 that is the source of the packet 200. The packet destination 210 may specify the node 105 and/or functional unit 115 that is the destination of the packet 200.

The payload 215 may comprise data that is communicated between the source and destination nodes 105 and/or functional units 115. The traversal timestamp 235 may comprise a start time for the packet 200 exiting a source node 105 and/or functional unit 115. In addition, the traversal timestamp 235 may comprise an end time for the packet 200 arriving at the destination node 105 and/or functional unit 115 specified by the packet destination 210. The payload 215 may include data and/or code.

Figure 2B:
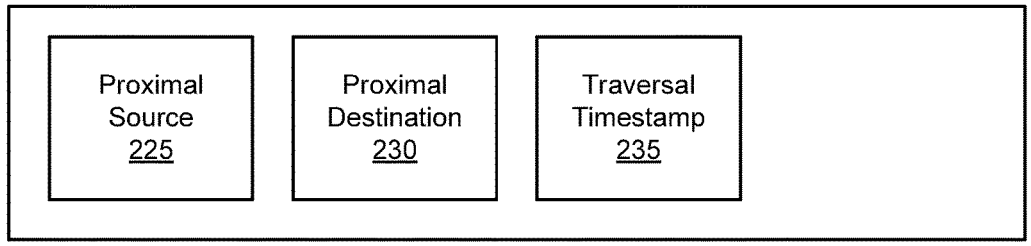
FIG. 2B is a schematic block diagram illustrating one embodiment of a proximal analogous packet.

FIG. 2B is a schematic block diagram illustrating one embodiment of the proximal analogous packet 220. The proximal analogous packet 220 may also be communicated between nodes 105 and/or functional units 115 in the same manner as the packet 200. In one embodiment, a proximal analogous packet 220 corresponds to a given packet 200 that is traversing the MPSoC 100 to or from a node 105 and/or functional unit 115 of interest.

The proximal analogous packet 220 includes a proximal source 225, a proximal destination 230, and the traversal timestamp 235. The proximal source 225 may specify the node 105 and/or functional unit 115 that is the source of the proximal analogous packet 220. The proximal destination 230 may specify the node 105 and/or functional unit 115 that is the destination of the proximal analogous packet 220.

The proximal source 225 may be modified from the packet source 205 of the given packet 200. The proximal source 225 may be within a specified distance of the packet source 205 of the given packet 200. In one embodiment, the specified distance is one hop 175. Alternatively, the specified distance may be two hops 175.

The proximal destination 230 may be modified from the packet destination 210 of the given packet 200. The proximal destination 230 may be within the specified distance of the packet destination 210 of the given packet 200. FIGS. 3A-E show examples of modifying the proximal source 225 and the proximal destination 230.

In one embodiment, the proximal analogous packet 220 includes the traversal timestamp 235. The traversal timestamp 235 may comprise a start time for the proximal analogous packet 220 exiting a source node 105 and/or functional unit 115. In addition, the traversal timestamp 235 may comprise an end time for the proximal analogous packet 220 arriving at the destination node 105 and/or functional unit 115.

Figure 3A:
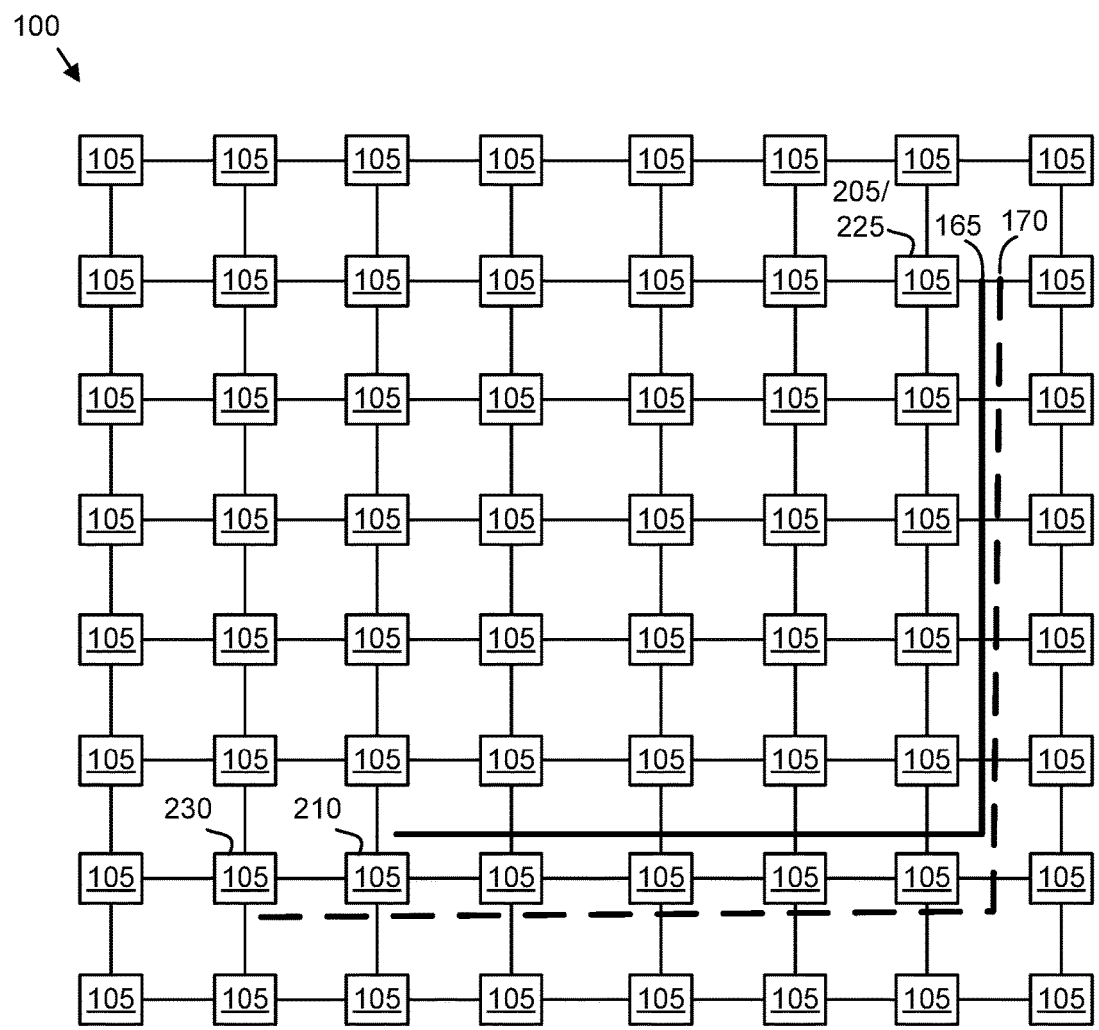
FIGS. 3A-E are schematic block diagrams illustrating embodiments of packet and proximal analogous packet routing.

FIGS. 3A-E are schematic block diagrams illustrating embodiments of packet 200 and proximal analogous packet 220 routing. FIG. 3A depicts a packet route 165 of a given packet 200 transmitted from a packet source 205 to a packet destination 210 in the MPSoC 100. In addition, a proximal analogous packet 220 may be transmitted from a proximal source 225 co-located with the packet source 205 over a proximal route 170 a proximal destination 230. In the depicted embodiment, the proximal destination 230 modified from the packet destination 210 and is a one hop specified distance from the packet destination 210, wherein one hop 175a is one link 110. In addition, the proximal route 170 is one hop 175 longer than the packet route 165.

Alternatively, the proximal destination 230 may be two or less hops 175 from the packet destination 210. For example, the proximal destination 230 may be co-located with the packet destination 210 and be separated by two hops 175, wherein a hop 175b is between two adjacent functional units 115.

Figure 3B:
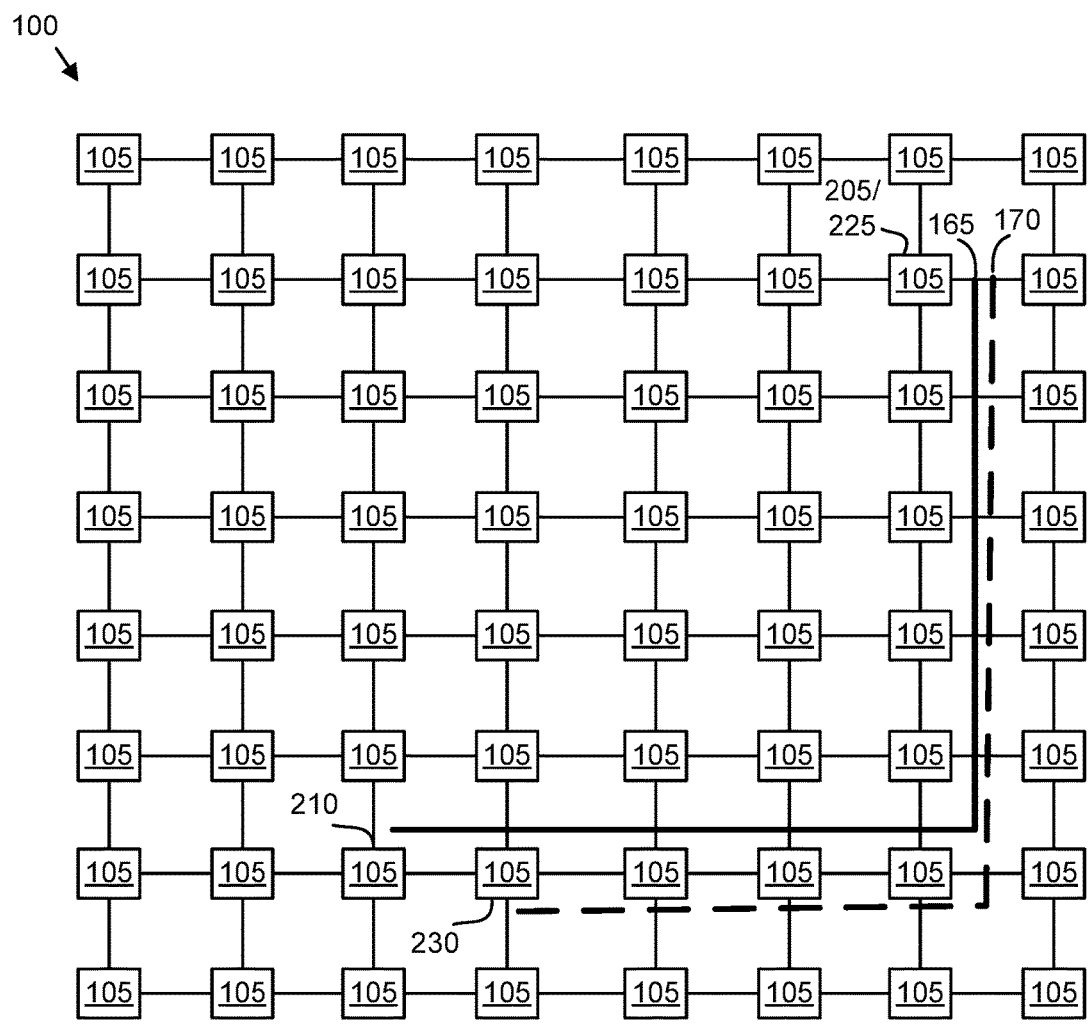

FIG. 3B shows the MPSoC 100 of FIG. 3A with an alternate proximal destination 230. The proximal destination 230 is the packet destination 210 modified by one hop 175. In the depicted embodiment, the proximal route 170 is one hop 175 shorter than the packet route 165. In one embodiment, the proximal source 225 may be modified from the packet source 205 and the proximal destination 230 may be modified from the packet destination 210.

Figure 3C:
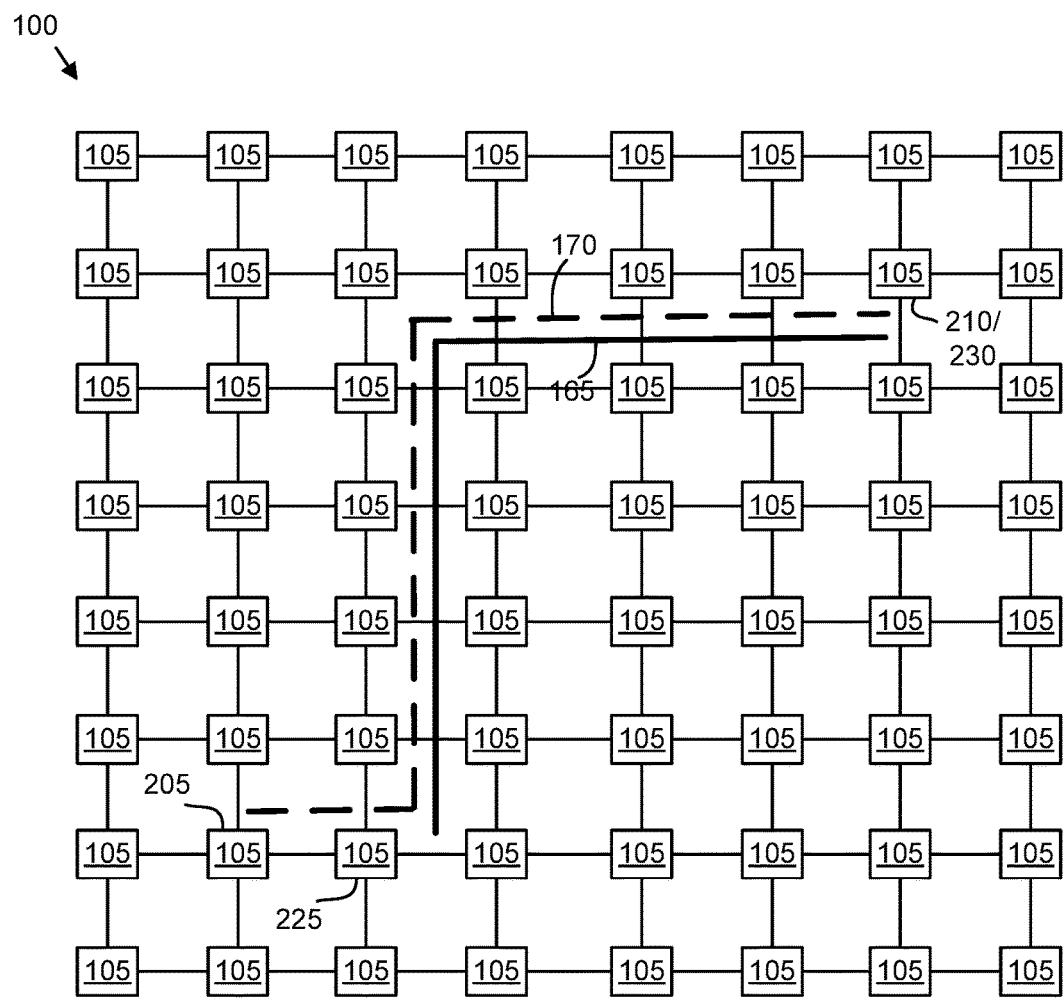

FIG. 3C depicts a packet route 165 of the packet 200 transmitted from the packet source 205 over a packet route 165 to the packet destination 210 in the MPSoC 100. In addition, a proximal analogous packet 220 may be transmitted from a proximal source 225 over a proximal route 170 to a proximal destination 230 co-located with the packet destination 210. The proximal source 225 may be modified from the packet source 205 by one hop 175. As a result, the proximal route 170 is one hop 175 longer than the packet route 165.

Figure 3D:
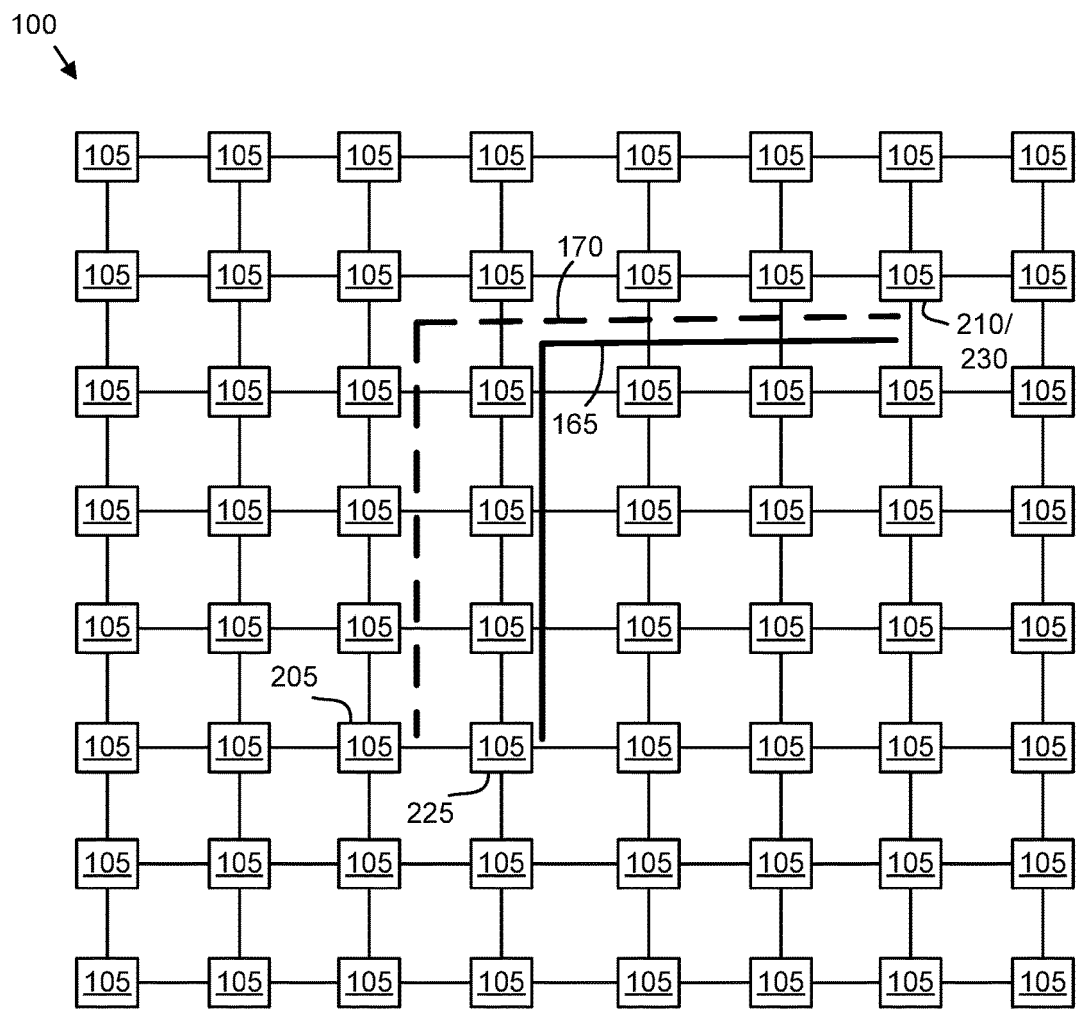

FIG. 3D shows the MPSoC 100 of FIG. 3C with an alternate proximal source 225. In the depicted embodiment, the proximal source 225 is modified from the packet source 205 by one hop 175. As a result, the proximal route 170 is one hop 175 shorter than the packet route 165.

Figure 3E:
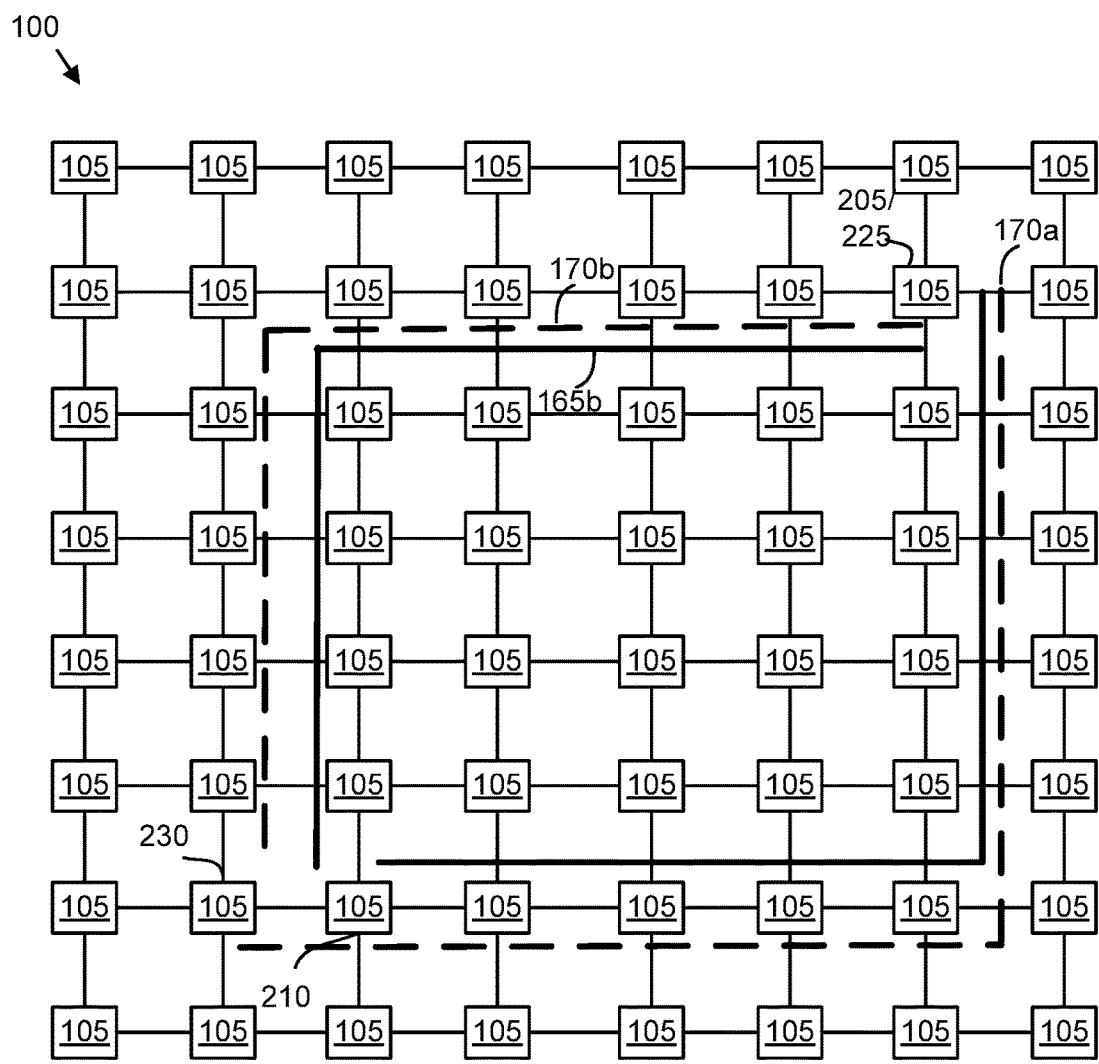

FIG. 3E depicts a packet route 165 of FIG. 3A with the packet 200 transmitted from the packet source 205 over a first packet route 165a to the packet destination 210 in the MPSoC 100. In addition, the proximal packet 220 may be transmitted from the packet source 205/proximal source 225 over a first proximal route 170a to the proximal destination 230.

In one embodiment, the packet 200 is further transmitted from the packet destination 210 over a second packet route 165b to the packet source 205. In addition, the proximal packet 220 may be transmitted from the proximal destination 230 over a second proximal route 170b to the packet source 205/proximal source 225. As a result, the combined proximal routes 170a-b may be two hops 175 longer than the combined packet routes 165a-b.

Figure 4:
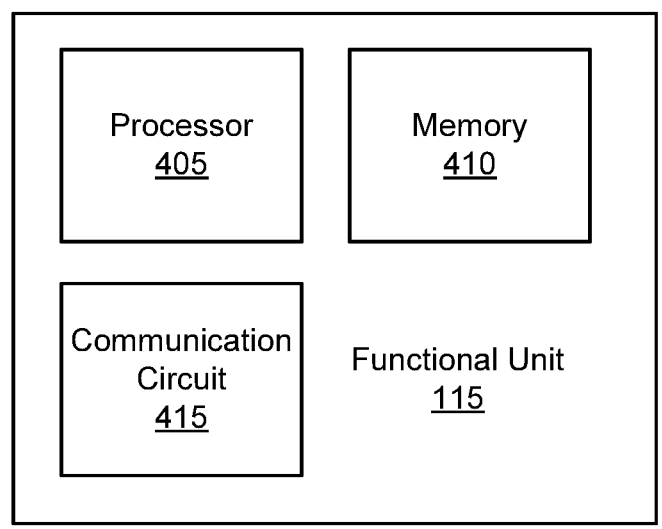
FIG. 4 is a schematic block diagram illustrating one embodiment of the functional unit.

FIG. 4 is a schematic block diagram illustrating one embodiment of the functional unit 115. In the depicted embodiment, the functional unit 115 includes a processor 405, a memory 410, and a communication circuit 415. The memory 410 may be a semiconductor memory and may store code. The processor 405 may execute the code. The communication circuit 415 may communicate with the router 120.

Figure 5:
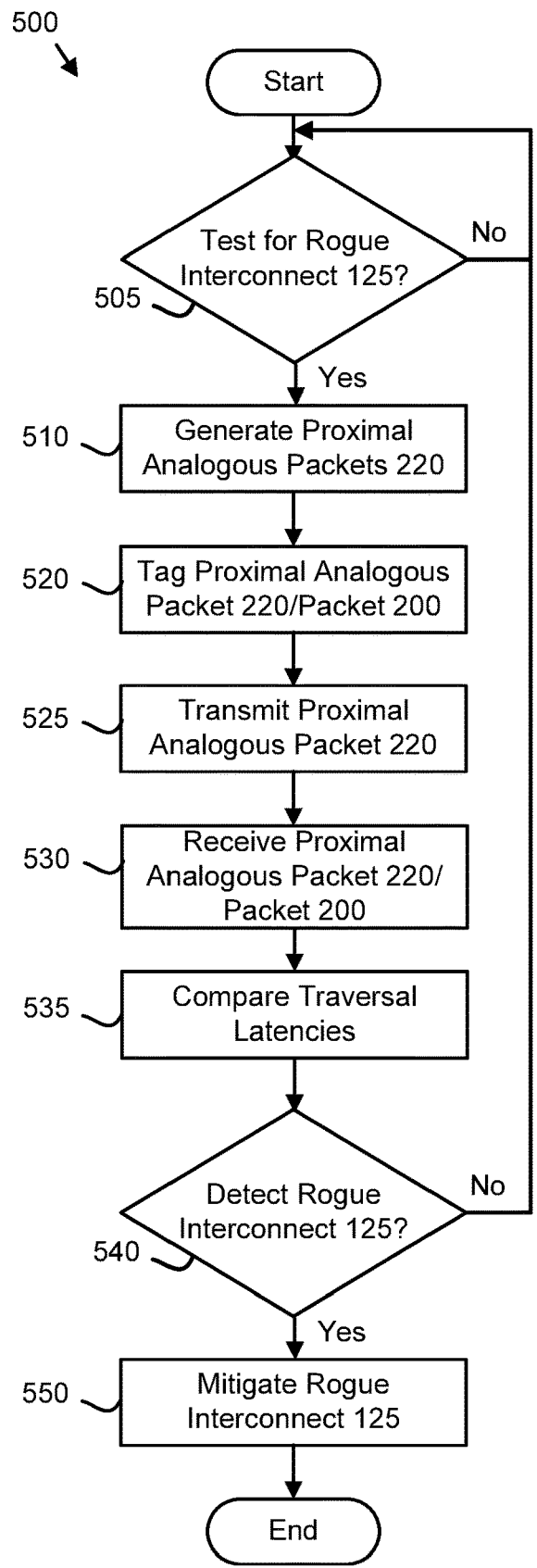
FIG. 5 is a schematic flow chart diagram illustrating one embodiment of a rogue interconnect detection method.

FIG. 5 is a schematic flow chart diagram illustrating one embodiment of a rogue interconnect detection method 500. The method 500 may detect a rogue interconnect in the MPSoC 100. The method 500 may be performed by one or more processors 405 in a functional unit 115 of the MPSoC 100. Alternatively, the method 500 may be performed by a computer readable storage medium such as a memory 410 in a functional unit 115 of the MPSoC 100. The computer readable storage medium may store code that is executed by a processor 405. In addition, the method 500 may be performed by one or more semiconductor gates.

The method 500 starts, and in one embodiment, the processor 405 determines 505 whether to test for a rogue interconnect 125. In one embodiment, the processor 405 determines 505 to test for the rogue interconnect 125 in response to an activity measure increasing above an activity threshold. The activity may be a transmission of packets 200 within the MPSoC 100 and the activity threshold may be a specified number of packets 200 that are transmitted. Alternatively, the activity may be a power consumption by the MPSoC 100 and the activity threshold may be a specified power consumption. In one embodiment, the activity may be communications with devices outside of the MPSoC 100 and the activity threshold may be a specified number of communications.

In an alternative embodiment, the processor 405 determines 505 to test for the rogue interconnect 125 in response to available bandwidth falling below a bandwidth threshold. The available bandwidth may be available transmission bandwidth on one or more specified links 110. Alternatively, the available bandwidth may be available transmission bandwidth to and/or from the MPSoC 100. The bandwidth threshold may be a specified available bandwidth.

In a certain embodiment, the processor 405 determines 505 to test for the rogue interconnect 125 within a periodic epoch. The epoch may be a specified time interval, a specified number of clocks, a specified number of communications transmitted outside of the MPSoC 100, a specified number of communications received by the MPSoC 100, or the like. For example, if the epoch is a specified time interval, the processor 405 may determine 505 to test for the rogue interconnect 125 when the specified time interval expires.

If the processor 405 determines 505 not to test for the rogue interconnect 125, the processor 405 loops to determine 505 whether to test. If the processor 405 determines 505 to test for the rogue interconnect 125, the processor 405 generates 510 a proximal analogous packet 220 that corresponds to a given packet 200 from a packet source 205 traversing a packet route 165 within the MPSoC 100. The proximal analogous packet 220 may be generated 510 at a proximal source 225.

Each proximal analogous packet 220 may comprise one or more of a proximal source 225 and a proximal destination 230. The proximal source 225 may be modified from a given packet source 205. The proximal source 225 may be within a specified distance of the packet source 205. The specified distance may be one hop 175. Alternatively, the specified distance may be two or less hops 175.

The proximal destination 230 may be modified from a given packet destination 210. The proximal destination 230 may be within the specified distance of the packet destination 225.

The processor 405 may tag 520 each proximal analogous packet 220 and each corresponding given packet 200 with a traversal timestamp 235. The traversal timestamp 235 for the packet 200 may include the start time when the packet 200 is transmitted from the packet source 205. The traversal timestamp 235 for the proximal analogous packet 220 may include the start time when the proximal analogous packet 220 is transmitted from the proximal source 225.

The processor 405 may transmit 525 the proximal analogous packet 220 over the proximal route 170. In one embodiment, the processor 405 transmits 525 the proximal analogous packet 220 within a transmission time interval of a transmission of the packet 200 from the packet source 205 over the packet route 165.

In one embodiment, the packet destination 210 receives 530 the packet 200 and the proximal destination 230 receives 530 the proximal analogous packet 220. The processor 405 may record each end time when the packet 200 is received 530 at the packet destination 210 and when the proximal analogous packet 220 is received at the proximal destination 230 in the respective traversal timestamps 235.

In addition, the processor 405 may compare 535 traversal latencies between each proximal analogous packet 220 and given packet 200 pair. For example, the processor 405 may calculate a traversal latency for a proximal analogous packet 220 over a proximal route 170 as a difference between a start time and an end time of the traversal timestamp 235 for the proximal analogous packet 220. The processor 405 may further calculate a traversal latency for the packet 200 over the packet route 165 as a difference between a start time and an end time of the traversal timestamp 235 for the packet 220.

The processor 405 may further calculate the difference between the traversal latencies of the proximal analogous packet 220 and the corresponding given packet 200. In one embodiment, the processor 405 may adjust the traversal latency for a proximal analogous packet 220 to compensate for differences between the proximal route 170 of the proximal analogous packet 220 and the packet route 165 of the given packet 200. For example, if the proximal route 170 of the proximal analogous packet 220 is shorter than the packet route 165 of the given packet 200, the travel latency for the proximal analogous packet 220 may be adjusted as a function of a difference in hops 175 between the proximal route 170 of the proximal analogous packet 220 and the packet route 165 of the given packet 200 and as a function of average hop traversal latency.

The processor 405 may further detect 540 the rogue interconnect 125 in response to variations in the traversal latencies and the method 500 ends. The variations in traversal latencies may be aggregate variations in traversal latencies. In one embodiment, the processor 405 collects a sample of traversal latencies over a detection time. The detection time dt may be calculated using Equation 1, wherein n is a number of flits for the sample, df is a detection factor, i is a packet injection rate from a functional unit 115, m is a number of runtime phases for transmitting proximal analogous packets 220 and corresponding packets 200, and P is a length of each runtime phase. A phase may be one or more clock cycles.

$$dt = \frac{n}{df * i} * \frac{1}{mP} \quad \text{Equation 1}$$

The detection factor may be calculated using Equation 2, wherein T is a test length.

$$df = T/P \quad \text{Equation 2}$$

In one embodiment, the processor 405 may detect 540 the rogue interconnect 125 in response to the aggregate variations in the traversal latencies exceeding a variation threshold. For example, the processor 405 may compare the traversal latencies for three packet 200/proximal analogous packet 220 pairs and determine an aggregate variation for the pairs. If the aggregate variation exceeds the variation threshold, the processor 405 may detect 540 the rogue interconnect 125.

In one embodiment, the processor 405 may detect 540 the rogue interconnect 125 as disposed in a specific node 105 by transmitting proximal analogous packets 220 from a plurality of proximal sources 225 to a plurality of proximal destinations 230. The processor 405 may further determine proximal routes 170 that are unaffected by the rogue interconnect 125 and proximal routes 170 that are affected by the rogue interconnect 125. The processor 405 may determine the host node 105 of the rogue interconnect 125 by comparing the proximal routes 170. The rogue interconnect 125 may lie along an intersection of packet routes 165 with traversal latencies that exceed the variation threshold.

If the processor 405 does not detect 540 the rogue interconnect 125, the processor 405 loops to determine 505 whether to test. If the processor 405 detects 540 the rouge interconnect 125, the processor 405 may mitigate 550 the rogue interconnect 125 and the method 500 ends. The processor 405 may mitigate 550 the rogue interconnect 125 by deactivating the rogue interconnect 125.

Alternatively, the processor 405 may mitigate 550 the rogue interconnect 125 by restricting the rogue interconnect 125. For example, the rogue interconnect 125 may be restricted from communicating with a router 120 and/or a link 110.

In one embodiment, the processor 405 mitigates 550 the rogue interconnect 125 by reporting the rogue interconnect 125 to a specified reporting address.

The embodiments generate a plurality of proximal analogous packets 220 that each correspond to a given packet 200 traversing the MPSoC 100 and compare the traversal latencies between each proximal analogous packet 220/packet 200 pair. The embodiments further detect the rogue interconnect 125 in response to variations in the traversal latencies. As a result, the embodiments may detect and mitigate the rogue interconnects 125.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory storing code executable by the processor to:
generate a plurality of proximal analogous packets each corresponding to a given packet traversing a multiprocessor system-on-chips (MPSoC), wherein each proximal analogous packet comprises one or more of a proximal source that is within one hop from a given packet source and a proximal destination that is within one hop from a given packet destination;
compare traversal latencies between each proximal analogous packet/given packet pair, wherein a sample of the traversal latencies is collected over a detection time dt calculated as $$dt = \frac{n}{df * i} * \frac{1}{mP}$$

wherein n is a number of packets for the sample, df is a detection factor calculated as df=T/P, T is a test length, i is a packet injection rate, m is a number of runtime phases, and P is a length of each runtime phase; and
detect a rogue interconnect in response to aggregate variations in the traversal latencies.

2. The apparatus of claim 1, wherein the processor further tags each proximal analogous packet and each given packet with a traversal timestamp.

3. The apparatus of claim 1, wherein the processor generates the plurality of proximal analogous packets and compares the traversal latencies within a periodic epoch.

4. The apparatus of claim 1, wherein the processor generates the plurality of proximal analogous packets and compares the traversal latencies in response to available bandwidth falling below a bandwidth threshold.

5. The apparatus of claim 1, wherein the processor generates the plurality of proximal analogous packets and compares the traversal latencies in response to an activity measure increasing above an activity threshold.

6. The apparatus of claim 1, wherein the processor mitigates the rogue interconnect in response to detecting the rogue interconnect by one or more of deactivating the rogue interconnect, restricting the rogue interconnect, and reporting the rogue interconnect.

7. A method comprising:
generating, by use of a processor, a plurality of proximal analogous packets each corresponding to a given packet traversing a multiprocessor system-on-chips (MPSoC), wherein each proximal analogous packet comprises one or more of a proximal source that is within one hop from a given packet source and a proximal destination that is within one hop from a given packet destination;
comparing traversal latencies between each proximal analogous packet/given packet pair, wherein a sample of the traversal latencies is collected over a detection time dt calculated as $$dt = \frac{n}{df * i} * \frac{1}{mP} \qquad \text{Equation 1}$$

wherein n is a number of packets for the sample, df is a detection factor calculated as df=T/P, T is a test length, i is a packet injection rate, m is a number of runtime phases, and P is a length of each runtime phase; and
detecting a rogue interconnect in response to aggregate variations in the traversal latencies.

8. The method of claim 7, wherein the method further tags each proximal analogous packet and each given packet with a traversal timestamp.

9. The method of claim 7, wherein the method generates the plurality of proximal analogous packets and compares the traversal latencies within a periodic epoch.

10. The method of claim 7, the method further generating the plurality of proximal analogous packets and compares the traversal latencies in response to available bandwidth falling below a bandwidth threshold.

11. The method of claim 7, the method further generating the plurality of proximal analogous packets and compares the traversal latencies in response to an activity measure increasing above an activity threshold.

12. The method of claim 7, the method further mitigating the rogue interconnect in response to detecting the rogue interconnect by one or more of deactivating the rogue interconnect, restricting the rogue interconnect, and reporting the rogue interconnect.

13. A program product comprising a memory that stores code executable by a processor, to perform:
generating a plurality of proximal analogous packets each corresponding to a given packet traversing a multiprocessor system-on-chips (MPSoC), wherein each proximal analogous packet comprises one or more of a proximal source that is within one hop from a given packet source and a proximal destination that is within one hop from a given packet destination;
comparing traversal latencies between each proximal analogous packet/given packet pair, wherein a sample of the traversal latencies is collected over a detection time dt calculated as $$dt = \frac{n}{df * i} * \frac{1}{mP} \qquad \text{Equation 1}$$

wherein n is a number of packets for the sample, df is a detection factor calculated as df=T/P, T is a test length, i is a packet injection rate, m is a number of runtime phases, and P is a length of each runtime phase; and
detecting a rogue interconnect in response to aggregate variations in the traversal latencies.

14. The program product of claim 13, wherein the processor generates the plurality of proximal analogous packets and compares the traversal latencies within a periodic epoch.

15. The program product of claim 13, the processor further generating the plurality of proximal analogous packets and compares the traversal latencies in response to available bandwidth falling below a bandwidth threshold.

16. The program product of claim 13, the processor further generating the plurality of proximal analogous packets and compares the traversal latencies in response to an activity measure increasing above an activity threshold.

17. The program product of claim 13, the processor further mitigating the rogue interconnect in response to detecting the rogue interconnect by one or more of deactivating the rogue interconnect, restricting the rogue interconnect, and reporting the rogue interconnect.

* * * * *

UNITED STATES PATENT AND TRADEMARK OFFICE
CERTIFICATE OF CORRECTION

PATENT NO. : 10,057,281 B2
APPLICATION NO. : 15/079486
DATED : August 21, 2018
INVENTOR(S) : Shridevi et al.

Page 1 of 1

It is certified that error appears in the above-identified patent and that said Letters Patent is hereby corrected as shown below:

In the Specification

The "GOVERNMENT RIGHTS" in Column 1, Lines 18-21, should read as follows:
This invention was made with government support under grants CNS-1117425, CAREER-1253024, CCF-1318826, CNS-1421022, and CNS-1421068 awarded by the National Science Foundation. The Government has certain rights in the invention.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*